(12) United States Patent
Van Bonn et al.

(10) Patent No.: US 8,236,423 B2
(45) Date of Patent: Aug. 7, 2012

(54) METHOD FOR THE MODIFICATION OF THE SURFACE OF SHAPED PARTS MADE OF PLASTIC BY FLUORINE-INITIALIZED OXIDATION

(75) Inventors: Rolf Van Bonn, Duisburg (DE); Joachim Barbe, Tönisvorst (DE)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 879 days.

(21) Appl. No.: 12/282,250

(22) PCT Filed: Mar. 13, 2007

(86) PCT No.: PCT/EP2007/002183
§ 371 (c)(1),
(2), (4) Date: Jan. 12, 2009

(87) PCT Pub. No.: WO2007/107263
PCT Pub. Date: Sep. 27, 2007

(65) Prior Publication Data
US 2009/0305034 A1    Dec. 10, 2009

(30) Foreign Application Priority Data
Mar. 17, 2006    (DE) .......................... 10 2006 012 366

(51) Int. Cl.
*B32B 9/04*    (2006.01)
*B05D 1/40*    (2006.01)
*B05D 3/02*    (2006.01)
*B05D 3/04*    (2006.01)

(52) U.S. Cl. ..................... 428/411.1; 427/331; 427/372; 427/377

(58) Field of Classification Search .......................... None
See application file for complete search history.

(56) References Cited

U.S. PATENT DOCUMENTS

| 4,020,223 A | * | 4/1977 | Dixon et al. ................... 442/93 |
| 4,764,405 A | | 8/1988 | Bauman |
| 5,073,231 A | * | 12/1991 | Eschwey et al. ............... 216/58 |
| 5,147,724 A | | 9/1992 | Eschwey |
| 5,567,371 A | * | 10/1996 | Karsch ........................... 264/83 |
| 5,654,378 A | | 8/1997 | Dehennan |

FOREIGN PATENT DOCUMENTS

| DE | 2412025 | 9/1974 |
| DE | 3840269 | 5/1990 |
| DE | 280772 | 7/1990 |
| DE | 101 08 723 | 8/2002 |
| DE | 19832559 | 9/2002 |
| EP | 0503786 | 2/1992 |
| EP | 0629654 | 12/1994 |
| EP | 0730948 | 9/1996 |
| JP | 0230888 | 12/1990 |
| JP | 2308888 | 12/1990 |
| JP | 4315832 | 11/1992 |

OTHER PUBLICATIONS

PCT Search Report for PCT/EP2007/002183.
F.J. Du Toit, et al., "The Effect of Surface Fluorination on the Wettability of high density Polyethylene", Journal of Fluorine Chemistry 74 (1995) 43-38.
F.J. Du Toit, et al., "Surface Fluorination of Polypropylene 1. Characterisation of Surface Properties", Journal of Fluorine Chemistry 74 (1999) 107-114.
PCT Written Opinion for PCT/EP2007/002183.

* cited by examiner

*Primary Examiner* — Sheeba Ahmed
(74) *Attorney, Agent, or Firm* — Elwood L. Haynes; Allen E. White

(57) ABSTRACT

The invention relates to a method for the modification of the surface of shaped parts made of plastic by treatment with a gas mixture which comprises fluorine and oxygen. The surface tension of the modified surface of the shaped part is more than 25 mN/m greater than that of a surface comprising non-modified plastic material. The ratio of the partial pressure of fluorine to the partial pressure of oxygen is 1:10 or lower and the shaped part has a fluorine occupancy of less than 0.5 $\mu g/cm^2$ as a result of the treatment.

21 Claims, 1 Drawing Sheet

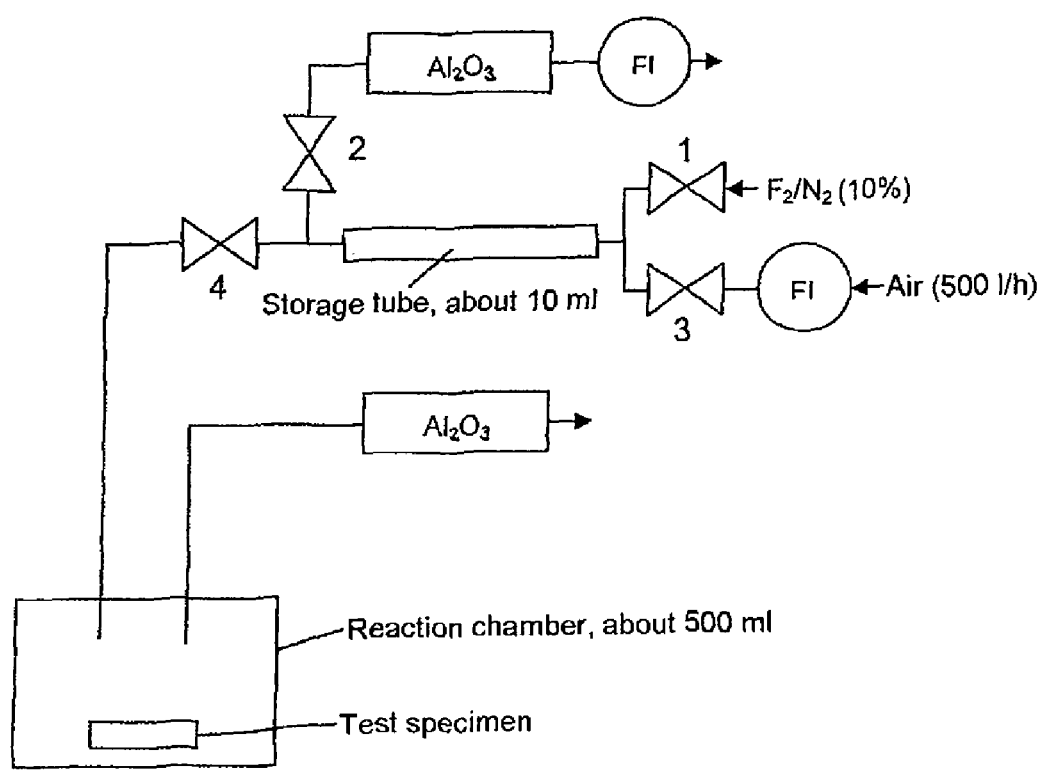

METHOD FOR THE MODIFICATION OF THE SURFACE OF SHAPED PARTS MADE OF PLASTIC BY FLUORINE-INITIALIZED OXIDATION

CROSS REFERENCE TO RELATED APPLICATIONS

This application is a §371 of International PCT Application PCT/EP2007/002183, filed Mar. 13, 2007.

FIELD OF THE INVENTION

The invention relates to a method for the modification of the surface of shaped parts made of plastic by treatment with a gas mixture which comprises fluorine and oxygen.

BACKGROUND

For the application of paints, adhesives or other coating materials to shaped parts made of plastic, the wettability thereof is of decisive importance. The organic plastics frequently used in practice, such as polyethylene (PE), polypropylene (PP), polyurethane (PU), acrylate/butadiene/styrene copolymers (ABS), polybutylene terephthalate (PBT) and polyamide (PA), as well as blends thereof have low surface energies and therefore have only very limited wettability. In order to be able to paint, coat or otherwise treat such plastics, a pretreatment of the surface of the plastic is absolutely essential.

In known methods, the shaped parts made of plastic are treated in particular by treatment with fluorine-containing gases. As a result of the fluorination, the originally substantially non-polar surface becomes very much more polar. At the same time, the surface is "chemically roughened" so that coating materials, such as paints, are better mechanically anchored thereon. As a result of increasing the polarity and the roughening, a mechanically strong bond stable for a long time is achieved between the part made of plastic and the coating medium present thereon (DE 101 08 723 A1; DE 198 32 559 A1; EP 0 730 948 A1).

Methods for fluorination in the presence of oxygen are also known. Thus, EP 0 629 654 B1 discloses a method for the pretreatment of those surfaces of parts made of plastic which are to be coated, in which method the parts made of plastic are treated with a gas mixture which comprises 3 to 5% by volume of fluorine, 10 to 16% by volume of oxygen and additionally at least one further inert gas, in particular nitrogen. The treatment is carried out in general so that the shaped parts are introduced into a reaction chamber and the air pressure in the reaction chamber is reduced to 200 mbar. A mixture of fluorine and nitrogen is then passed into this residual air. The amount of the gas mixture passed in is chosen so that the pressure in the reaction chamber increases by 100 to 200 mbar per minute until a total pressure of 333 to 400 mbar is reached. The fluorine-containing gas acts for about 10 to 180 seconds altogether on the shaped parts made of plastic. The method is carried out at reduced pressure; appropriately strong reaction chambers and vacuum pumps are therefore required. In addition the method requires a relatively long time. Moreover, a relatively high proportion of fluorine is employed. Fluorine from the treatment gas is incorporated into the surface of the shaped part in a measurable amount.

DE 38 40 269 C2 discloses a method for producing smooth surfaces on articles made of polymers of ethylene, propylene, butadiene or polystyrene. For this purpose, the articles are exposed to a gas mixture comprising 0.01 to 0.5% by volume of fluorine, 0.5 to 21% by volume of oxygen and nitrogen. In the examples of the DE-C, a gas mixture in which the volume ratio of fluorine to oxygen is 1:6.5 is used. The fluorinated surface layers produced therewith comprise substantially measurable amounts of fluorine (about 6 µg of fluorine per $cm^2$) and—in contrast to surfaces fluorinated in the absence of oxygen—are distinguished by a uniformly smooth structure. Mechanical interlocking with a paint or adhesive layer applied to said surface therefore cannot be achieved. Accordingly, a strong bond does not exist between the different materials. An increase in the polarity of the surface of the shaped parts with simultaneous chemical roughening was achieved to date only by fluorination in the absence of oxygen. The atmospheric oxygen had to be removed from the reaction chamber before the fluorination by flushing with inert gas.

It was therefore the object to provide a method by means of which the polarity of the surface of shaped parts made of plastic can be increased and by means of which at the same time (chemical) roughening can be carried out. The method should be easy to carry out—i.e. even at atmospheric pressure. It should manage without time-consuming flushing with inert gas. The shaped parts should be particularly readily coatable after the treatment and the paint coat should have a strong durable bond to the shaped part.

SUMMARY OF THE INVENTION

The present invention is a method for the modification of the surface of a shaped part made of plastic by treatment with a gas mixture comprising fluorine and oxygen. With regard to the present invention, the surface tension of the modified surface of the shaped part is more than 25 mN/m greater than that of a surface of non-modified plastic material. In addition, the ratio of the partial pressure of fluorine to the partial pressure of oxygen is 1:10 or lower and the shaped part has a fluorine occupancy of less than 0.5 $\mu g/cm^2$ as a result of the treatment.

The present invention accordingly relates to a method for the modification of the surface of shaped parts made of plastic by treatment with a gas mixture which comprises fluorine and oxygen, in which the surface tension of the modified surface is more than 25 mN/m greater than that of a surface comprising non-modified plastic material, which is characterized in that the ratio of the partial pressure of fluorine to the partial pressure of oxygen is 1:10 or lower and in that the shaped part has a fluorine occupancy of less than 0.5 $\mu g/cm^2$ as a result of the treatment. The ratio of the partial pressure of fluorine to the partial pressure of oxygen is preferably 1:50 to 1:2000, particularly preferably 1:200 to 1:1000. Surprisingly, an at least as great an increase in the surface tension is achieved, and also in a substantially shorter time span, with a fluorine-to-oxygen ratio which is substantially reduced compared with the prior art. Moreover, virtually no fluorine is detectable in the surface of the shaped parts made of plastic and treated according to the invention. On investigation of the surface of the shaped parts modified by the method according to the invention with the aid of ATR infrared spectroscopy, carboxyl groups are detectable. It is assumed that the increase in the surface tension is due in particular to these carboxyl groups formed by oxidation. The oxidation is initiated by the fluorine without it being incorporated into the surface. In the case of a fluorine treatment in the absence of oxygen, the activation of the surface of the shaped parts made of plastic is effected exclusively by the formation of polar CHF groups. The formation of the CHF groups is suppressed by oxygen. If, however, a relatively small amount of oxygen is present, as in the abovementioned methods, the oxidation is not sufficient for compensating the effect of the (no longer formed) CHF groups. Only in the case of a large excess of oxygen, i.e. at a ratio of the partial pressure of fluorine to the partial pressure of oxygen of 1:10 or less, is virtually complete oxidation of the surface of the shaped parts made of plastic achieved, together with the surface tension increase necessary for coating or painting. At the same time, the surface is chemically roughened, which ensures a bond between the shaped part made of plastic and the coating which is stable in the long term.

The method is preferably carried out at a total pressure of 900 to 1100 mbar, particularly preferably at atmospheric pressure, i.e. at about 1 bar. However, it can also be carried out at reduced pressure, i.e. at about 200 mbar abs. to less than 900 mbar. However, this embodiment requires apparatus which is more complicated since vacuum pumps and vacuum-resistant reaction chambers are required.

In addition to fluorine and oxygen, the gas mixture generally also comprises at least one gas which is inert under the treatment conditions, generally nitrogen and/or argon. In a particularly preferred embodiment, a mixture of fluorine and nitrogen (which generally comprises 0.1 to 20% by volume of fluorine, a mixture of 10% by volume of fluorine and 90% by volume of nitrogen, or 5% of fluorine in air, which is also commercially available, being preferred) is metered into a reaction chamber in which the shaped part made of plastic which is to be treated is present in an air atmosphere, for example at atmospheric pressure. The resulting gas atmosphere then also comprises about 78% by volume of nitrogen and about 1% by volume of argon as inert gasses in addition to about 21% by volume of oxygen. However, treatment gasses comprising more than 21% by volume of oxygen can also be used.

The duration of action of the gas mixture comprising fluorine and oxygen is relatively short. It is in general about 10 seconds to 10 minutes, preferably about 20 seconds to 5 minutes, particularly preferably 30 seconds to 4 minutes. It is thus substantially shorter than in known methods.

The oxidative treatment of the shaped parts made of plastic is preferably effected at room temperature, i.e. at about 20 to 25° C., but can in principle also be effected in a wider temperature range from about 0 to 80° C., preferably about 10 to 60° C., particularly preferably 15 to 50° C. The duration of action should be adapted to the respective treatment temperature.

The method according to the invention is suitable for all shaped parts, the surface of which is formed by an oxidizable organic plastic, in particular by a plastic which comprises no oxygen, such as a polyolefin (especially polyethylene (PE), polypropylene (PP), butylene, an ethylene/propylene copolymer or an ethylene/propylene/($C_4$-$C_8$)alpha-olefin copolymer), a styrene/acrylonitrile copolymer or an acrylonitrile/butadiene/styrene copolymer (ABS). The surface can also be formed by an oxidizable oxygen-containing plastic, such as polyurethane (PU), polyester (especially polyethylene terephthalate (PET) or polybutylene terephthalate (PBT)) or polyamide (PA). In relation to the method according to the invention, the term "copolymer" represents polymers having two or more different monomer units, i.e. also represents terpolymers, etc. Shaped parts, the surface of which is formed by fluorinated and/or chlorinated plastics, such as polyvinyl chloride (PVC) or polyvinylidene chloride (PVDC), which are only very poorly oxidizable or not oxidizable at all, are less suitable or are unsuitable for the method according to the invention. However, such plastics may occur in deeper layers or regions which are not exposed to the oxidation.

BRIEF DESCRIPTION OF THE SEVERAL VIEWS OF THE DRAWING

FIG. 1 schematically shows a setup suitable for carrying out the method according to the present invention.

DETAILED DESCRIPTION OF THE INVENTION

FIG. 1 schematically shows a setup suitable for carrying out the method according to the invention. This comprises a storage tube, which is filled with a fluorine/nitrogen gas mixture via the valve (1) when valve (2) is opened, and a reaction chamber in which the shaped part made of plastic which is to be treated is present. The storage tube has a volume of about 10 ml. A further 2 ml of gas mixture are present in the T-pieces, screw unions, etc. With the aid of an air stream fed in at a high metering rate (500 l/h) via the valve (3) opened for a short time, the fluorine/nitrogen gas mixture is then fed to the reaction chamber via the valve (4). The reaction chamber has a volume of about 500 ml. After expiry of the predetermined duration of action, the valve (3) is opened again and the fluorine/nitrogen mixture mixed with air is flushed out of the reaction chamber and passed over an $Al_2O_3$ absorber.

The invention furthermore relates to a fluorine-initiated shaped part made of plastic and modified on the surface by oxidation, which is characterized in that the fluorine occupancy on the surface is less than 0.5 µg/cm$^2$ and the surface tension of the oxidized plastic material is more than 25 mN/m, preferably more than 30 mN/m, greater than that of the unoxidized plastic material. The difference is determined by comparison with an untreated shaped part. If such a possibility for comparison is not available, the surface tension of the shaped part oxidized on the surface is first measured. The oxidized plastic material is then removed, for example by means of a cutting tool which is guided parallel to the surface and produces a sufficiently smooth new surface. Suitable cutting tools are, for example, an annular saw, a high-pressure water-jet cutting tool, a wire saw, a circular saw or a microtome. Depending on the type of plastic, it is as a rule sufficient to remove 2 to 10 µm, preferably 3 to 6 µm, from the surface. In this way, a surface comprising unoxidized plastic material is created. If the surface tension of this newly created surface is 25 mN/m or more below that of the oxidatively modified surface, the shaped part is a shaped part according to the invention. The fluorine occupancy of the oxidized shaped part is in general below the limit of detection. This is 0.5 µg/cm$^2$. In contrast, shaped parts made of plastic and pretreated by the method according to EP 0 629 654 B1 show a fluorine occupancy of 2 µg/cm$^2$ or more.

The following examples serve for illustrating the invention. Percentages are to be understood as being percentages by volume, unless stated otherwise or directly evident otherwise from the context.

Example 1

The storage tube of the experimental arrangement shown in FIG. 1 was filled with 10 ml of a mixture of 10% of fluorine and 90% of nitrogen. The shaped part made of plastic and to be treated, comprising polyethylene (HDPE, LDPE, LLDPE or VLDPE), was present in an air atmosphere in the reaction chamber. When valve (4) was opened, valve (3) was opened for 10 s. As a result, the treatment gas was metered from the 800 mm long storage tube at a flow rate of 500 ml/h into the reaction chamber and directly flushed out again. The total treatment process—metering, action of fluorine and flushing—lasted for only 10 s.

After the treatment, the surface of the shaped part made of polyethylene had a matt surface structure and was substantially wettable with water. The surface tension after the treatment was 64 mN/m (before the treatment, the surface tension was 38 mN/m). Fluorine could not be detected in the surface of the test specimen.

Example 2

Example 1 was repeated with the difference that valve (3) was opened only for 1 s when valve (4) was opened. Thereafter, valve (3) was closed again. The fluorine/nitrogen treatment gas was transported into the reaction chamber with the air stream (flow rate 500 ml/h) fed in via the valve (3). Once again, a test specimen made of polyethylene was present in an atmosphere comprising air in said reaction chamber. Valve (3) was kept closed for 2 s (static action time of the treatment gas), and then opened for 15 s for flushing the reaction chamber. The total treatment process—metering, allowing to act, flushing—lasted only 18 s.

As in Example 1, the surface of the PE test specimen after the treatment was readily wettable with water. The surface tension had increased from 38 mN/m to 64 mN/m as a result of the treatment. No fluorine was detectable in the surface of the PE test specimen (investigation by elemental analysis using a 9000F fluoride analyser from Antek).

Example 3

Example 2 was repeated with the only difference that the treatment gas acted on the PE test specimen for 20 s instead of 2 s.

The surface properties of the test specimen were virtually the same as in Example 2.

Example 4

Example 2 was repeated with the only difference that a 400 mm long storage tube was used instead of an 800 mm long one. The storage tube had a volume of only 5 ml. Taking into account the volume of about 2 ml present in the screw unions, T-pieces, etc., a volume of treatment gas about 40% less than in Examples 1 to 3 was used.

Even with the reduced amount of fluorine, it was possible to achieve the desired effect. The surface of the PE test specimen was wettable and the surface tension had increased in the same way from 36 to 64 mN/m.

Comparative Example 1

Comparison with EP-B 0 629 654

As described in the EP-B, a PE test specimen was introduced into an air-filled reaction chamber at room temperature. The air pressure in the chamber was then reduced to 200 mbar. A treatment gas comprising 10% of $F_2$ and 90% of $N_2$ was then fed in at a metering rate of about 200 mbar/min until the pressure in the reaction chamber had increased to 400 mbar altogether. The static action time of the treatment gas was 3 min. The total duration of the treatment process—metering in and allowing to act—was 240 s.

After the treatment, fluorine was detectable in an amount of 2 µg/cm$^2$ in the surface of the PE test specimen. The surface tension had increased to virtually the same value as in the examples according to the invention.

The results of the individual experiments are listed in the table below.

TABLE

| Experiment | Metering time [s] | Action time static [s] | Amount of fluorine used [ml] | Flushing time (air) [s] | Total time [s] | Fluorine occupancy [µg/cm$^2$] | Surface tension [mN/m] |
|---|---|---|---|---|---|---|---|
| 1 | 1 | — | 1.2 | 9 | 10 | <0.5 | 64 |
| 2 | 1 | 2 | 1.2 | 15 | 18 | <0.5 | 64 |
| 3 | 1 | 20 | 1.2 | 15 | 36 | <0.5 | 64 |
| 4 | 1 | 2 | 0.7 | 9 | 12 | <0.5 | 64 |
| C1 | 60 | 180 | | | 240 | 2 | 64 |

Example 5

Shaped parts made of polyethylene were introduced into an air-filled reaction chamber having a volume of 127 l. Flushing of the chamber for removing the atmospheric oxygen was not carried out. 20 l of a treatment gas comprising 10% by volume of fluorine and 90% by volume of nitrogen were then metered into the chamber. The air displaced thereby was released via appropriate valves. The metering lasted for 1 minute, and the total action time, including the metering time, for 4 minutes. The treatment was effected at room temperature. After expiry of the action time, the reaction chamber was flushed with air, which was fed in via appropriate blowers and valves. As a result of the treatment, the surface tension of the shaped parts made of PE had increased from 32 to more than 64 mN/m. The shaped parts had a matt surface structure.

Example 6

Example 5 was repeated with the only difference that, instead of 20 litres of $F_2/N_2$ treatment gas, only 10 litres thereof were metered in. The effect of this treatment on the surface of the shaped part made of PE was virtually the same as in Example 5.

Example 7

Example 5 was repeated with the only difference that, instead of 20 litres of $F_2/N_2$ treatment gas, only 5 litres thereof were metered in. The effect of this treatment on the surface of the shaped part made of PE was virtually the same as in Example 5.

Comparative Example 2

The reaction chamber equipped with the test specimen made of PE was repeatedly evacuated and flushed with inert gas until it was virtually free of atmospheric oxygen. After evacuation again, 5 l of treatment gas (composition of the treatment gas as stated in Example 5) were metered in. The fluorination was therefore effected in the absence of oxygen. The total duration of action of the treatment gas (including the metering time) was once again 4 min.

After the treatment, the test specimen made of PE had retained its original surface roughness. The surface tension was 64 mN/m, but the surface was substantially more poorly wettable with water.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the modification of the surface of a shaped part made of plastic by treatment with a gas mixture comprising fluorine and oxygen, wherein the surface tension of the modified surface of the shaped part is more than 25 mN/m greater than that of a surface comprising non-modified plastic material, the ratio of the partial pressure of fluorine to the partial pressure of oxygen is 1:10 or lower and the shaped part has a fluorine occupancy of less than 0.5 µg/cm$^2$ as a result of the treatment.

2. The method of claim 1, wherein the total pressure of the gas mixture comprising fluorine and oxygen is 900 to 1100 mbar.

3. The method of claim 1, wherein the total pressure of the gas mixture comprising fluorine and oxygen is about 1 bar.

4. The method of claim 1, wherein the gas mixture comprising fluorine and oxygen acts on the shaped part for 2 s to 10 min.

5. The method of claim 3, wherein the gas mixture comprising fluorine and oxygen acts on the shaped part for 5 s to 5 min.

6. The method of claim 5, wherein the gas mixture comprising fluorine and oxygen acts on the shaped part for 10 s to 3 min.

7. The method of claim 1, wherein the ratio of the partial pressure of fluorine to the partial pressure of oxygen is 1:50 to 1:2000.

8. The method of claim 5, wherein the ratio of the partial pressure of fluorine to the partial pressure of oxygen is 1:200 to 1:1000.

9. The method of claim 1, wherein the gas mixture additionally comprises at least one gas which is inert under the conditions of the method.

10. The method of claim 9, wherein the at least one gas is selected from nitrogen, argon and mixtures thereof.

11. The method of claim 8, wherein the gas mixture additionally comprises at least one gas which is inert under the conditions of the method.

12. The method of claim 11, wherein the at least one gas is selected from nitrogen, argon and mixtures thereof.

13. The method of claim 1, wherein the shaped part made of plastic is treated at a temperature of 20 to 25° C. with the gas mixture.

14. The method of claim 12, wherein the shaped part made of plastic is treated at a temperature of 20 to 25° C. with the gas mixture.

15. The method of claim 1, wherein a shaped part is used, the surface of which is formed by an oxidizable organic plastic which comprises no oxygen.

16. The method of claim 15, wherein the oxidizable organic plastic is selected from a polyolefin, a styrene/acrylonitrile copolymer, an acrylonitrile/butadiene/styrene copolymer (ABS) and mixtures thereof.

17. The method of claim 16, wherein the polyolefin is selected from polyethylene, polypropylene, butylene, an ethylene/propylene copolymer or an ethylene/propylene/($C_4$-$C_8$)alpha-olefin copolymer.

18. The method of claim 1, wherein a shaped part is used, the surface of which is formed by an oxidizable organic plastic which comprises oxygen.

19. The method of claim 18, wherein the oxidizable organic plastic is a polyester, a polyurethane, a polyamide or mixtures thereof.

20. A shaped part made of plastic and having an oxidatively modified surface, wherein the fluorine occupancy on the surface is less than 0.5 µg/cm$^2$ and the surface tension of the oxidatively modified plastic material is more than 25 mN/m greater than that of the non-modified plastic material.

21. The shaped part made of plastic of claim 20, wherein the surface tension of the modified plastic material is more than 30 mN/m greater than that of the non-modified plastic material.

* * * * *